(12) United States Patent
Lee et al.

(10) Patent No.: US 9,077,567 B2
(45) Date of Patent: Jul. 7, 2015

(54) COOPERATIVE SPECTRUM SENSING APPARATUS AND COOPERATIVE SPECTRUM SENSING METHOD

(71) Applicant: RESEARCH & BUSINESS FOUNDATION SUNGKYUNKWAN UNIVERSITY, Suwon-si (KR)

(72) Inventors: Youngpo Lee, Suwon (KR); Seokho Yoon, Suwon (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 18 days.

(21) Appl. No.: 14/077,399

(22) Filed: Nov. 12, 2013

(65) Prior Publication Data

US 2015/0003508 A1 Jan. 1, 2015

(30) Foreign Application Priority Data

Jun. 26, 2013 (KR) .................. 10-2013-0073408

(51) Int. Cl.
*H04B 3/46* (2015.01)
*H04L 27/00* (2006.01)
*H04L 25/08* (2006.01)
*H04W 72/00* (2009.01)

(52) U.S. Cl.
CPC ............ *H04L 27/0006* (2013.01); *H04L 25/08* (2013.01); *H04W 72/00* (2013.01)

(58) Field of Classification Search
CPC .............. H04L 1/20; H04L 1/24; H04B 3/46; H04B 17/007; H04B 17/0075; H04B 17/009

USPC ......... 375/224, 227, 267, 285, 316, 340–341, 375/346, 348; 455/509; 370/252, 329
See application file for complete search history.

(56) References Cited

U.S. PATENT DOCUMENTS

| | | | | |
|---|---|---|---|---|
| 7,885,229 | B2 * | 2/2011 | Huttunen et al. | 370/329 |
| 7,949,357 | B2 * | 5/2011 | Huttunen et al. | 455/509 |
| 8,611,293 | B2 * | 12/2013 | Xin et al. | 370/329 |
| 8,711,720 | B2 * | 4/2014 | Heo et al. | 370/252 |
| 2013/0090145 | A1 * | 4/2013 | Wang et al. | 455/509 |

FOREIGN PATENT DOCUMENTS

KR 10-2013-0008065 A 1/2013

OTHER PUBLICATIONS

Korean Office Action issued Dec. 23, 2014, in counterpart Application No. 10-2013-0073408 (3 pages, in Korean).
Font-Segura, Josep, et al., "GLRT-based spectrum sensing for cognitive radio with prior information." Communications, IEEE Transactions on 58.7 (2010): 2137-2146.

* cited by examiner

*Primary Examiner* — Khanh C Tran
(74) *Attorney, Agent, or Firm* — NSIP Law

(57) ABSTRACT

Disclosed is a cooperative spectrum sensing (CSS) method. The CSS method includes receiving, by a detector of secondary users, observation vectors which are use state information of a spectrum band allocated to a PU in a cognitive radio (CR) network, generating, by the detector, an analysis result value with respect to each of the observation vectors using GLRT with respect to order statistics of reception samples taking non-Gaussian noise into consideration, transmitting, by the detector, the analysis result value to a fusion center unit; and fusing, by the fusion center unit, the analysis result value to determine whether the spectrum band is used.

20 Claims, 7 Drawing Sheets

(a)

(b)

(a)

(b)

COOPERATIVE SPECTRUM SENSING APPARATUS AND COOPERATIVE SPECTRUM SENSING METHOD

CROSS-REFERENCE TO RELATED APPLICATION

This application claims priority to and the benefit under 35 U.S.C. §119(a) of Korean Patent Application No. 10-2013-0073408, filed on Jun. 26, 2013, in the Korean Intellectual Property Office, the entire disclosure of which is incorporated herein by reference for all purposes.

BACKGROUND

1. Field

The following description relates to a cooperative spectrum sensing (CSS) apparatus and method used in cognitive radio (CR) communication.

2. Description of Related Art

Cognitive radio (CR) communication based on dynamic spectrum access highly attracts attentions as one solution with respect to frequency resource shortage problems. In a CR system, in a spectrum band allocated to a primary user (PU), a secondary user transmits signals in a corresponding spectrum band when a PU signal does not exist. Thus, a spectrum sensing method for accurately detecting presence and absence of a PU signal is a very important process in the CR system.

It is for the secondary users to perform accurate spectrum sensing due to a shadowing phenomenon and a multipath fading phenomenon.

Cooperative spectrum sensing (CSS) is a spectrum sensing method which is designed to overcome such uncertainties. In CSS, each of at least geographically distributed two users transmits local sensing data which is results collected through spectrum sensing to a fusion center, and the fusion center determines whether a PU uses the frequency band of interest using the local sensing data collected from the at least two users of the next order.

In a practical communication environment, impulsive non-Gaussian noise often occurs due to causes such as moving vehicles, an opening and closing transient state of power lines, vehicle ignition, a sea-surface reflected wave, lightning, and the like. Thus, a noise environment of the CR may be modeled as an impulsive noise model. In addition, each secondary user may experience a different noise environment in a CR network.

However, most of conventional CSS techniques have been developed so far on the assumption that noise follows normal distribution.

SUMMARY

In one general aspect, there is provided a cooperative spectrum sensing (CSS) apparatus including: a receiver of a secondary user configured to include a reception unit to receive observation vectors with respect to a spectrum band allocated to a primary user (PU), and a detection unit to generate an analysis result value with respect to each of the observation vectors using a generalized likelihood ratio test (GLRT) with respect to order statistics of reception samples taking non-Gaussian noise into consideration; and a fusion center unit configured to fuse the analysis result value to determine whether the spectrum band of interest is being used.

The detection unit may perform modeling on the non-Gaussian noise as a probability density function (PDF) of bivariate isotropic symmetric α-stable (BISαS) distribution.

The detection unit may include an order statistics unit configured to generate order statistics with respect to the observation vector, a test statistic generation unit configured to select an observation sample in size ascending order in the order statistics to generate GLRT test statistics, a local detector configured to yield detection result data with respect to presence and absence of a PU signal using the GLRT test statistics with respect to the observation sample, and a transmission unit configured to transmit the detection result data to the fusion center unit.

In another general aspect, there is provided a CSS method including: receiving, by a detector of secondary users, observation vectors which are use state information of a spectrum band allocated to a PU in a cognitive radio (CR) network; generating, by the detector, an analysis result value with respect to each of the observation vectors using GLRT with respect to order statistics of reception samples taking non-Gaussian noise into consideration; transmitting, by the detector, the analysis result value to a fusion center unit; and fusing, by the fusion center unit, the analysis result value to determine whether the spectrum band is being used.

The generating may include generating the order statistics with respect to the observation vector, selecting an observation sample in size ascending order in the order statistics to generate GLRT test statistics, and generating the analysis result value represented as 0 or 1 by adding up the GLRT test statistics.

Figure 1:
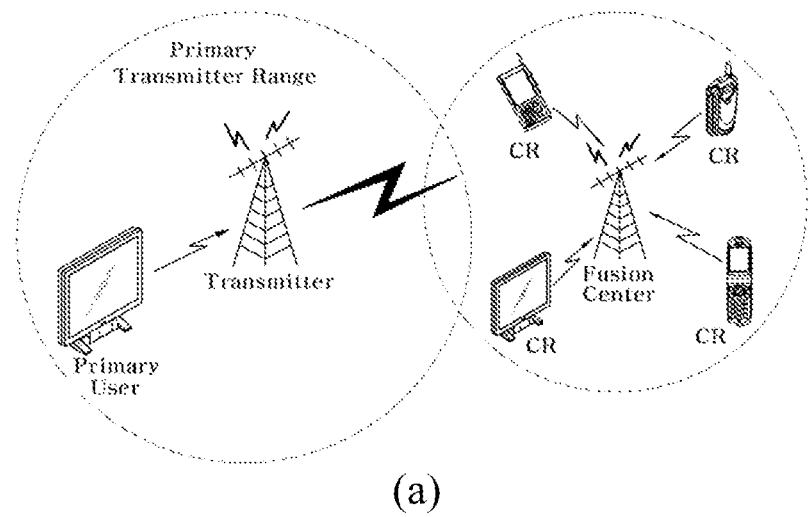
FIG. 1A illustrating an example of a schematic configuration of a cooperative spectrum sensing (CSS) apparatus in cognitive radio (CR) communication.
FIG. 1B is illustrating an example of a block diagram of a CSS apparatus.
Figure 1:
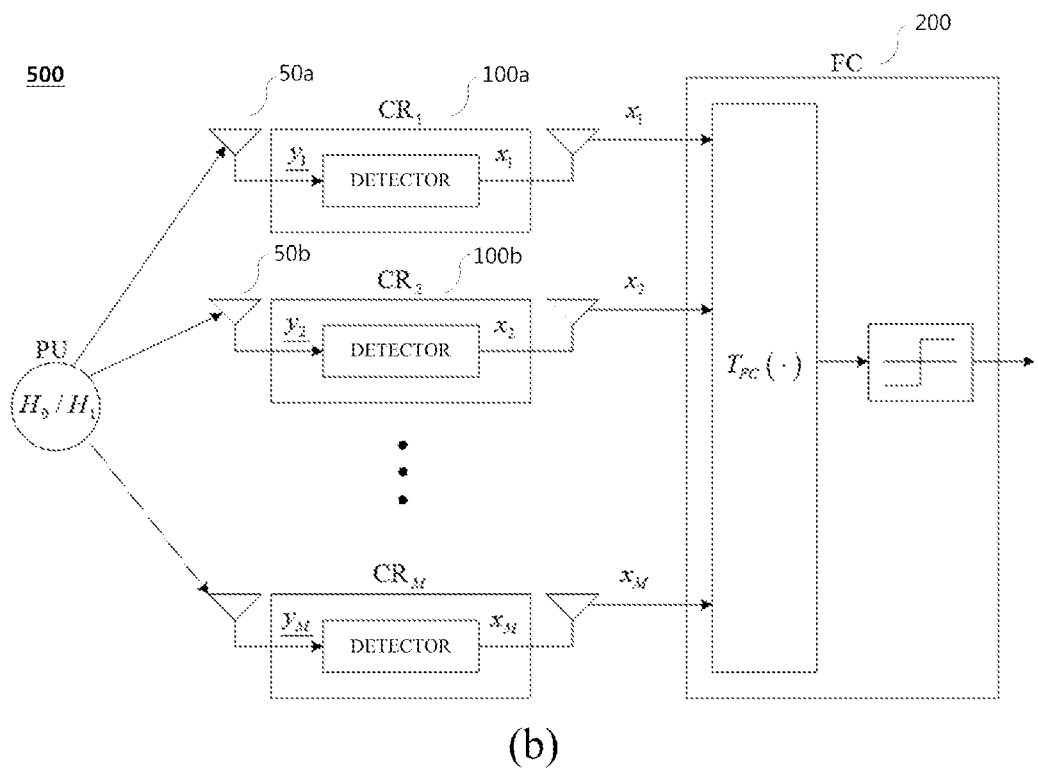

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

When performing a method or an operation method, each step constituting the method may occur in a different order from that specified above in the context which did not apparently write a specific order. In other words, each step may occur in the same order as specified, and may be performed substantially simultaneously with the step or may be performed in reverse order.

The present example relates to a cooperative spectrum sensing (CSS) apparatus 500 and a CSS method, and accurate spectrum sensing may be performed taking non-Gaussian noise into consideration, unlike the conventional invention.

FIG. 1A illustrates an example of a schematic configuration of a CSS apparatus in cognitive radio (CR) communication, and FIG. 1B is a block diagram illustrating a CSS apparatus.

Referring to FIG. 1A, a primary user (hereinafter, referred to as "PU") is allocated with a specific spectrum band so as to be connected to a network, and a secondary user collects information indicating whether the PU exists in a corresponding spectrum band (that is, whether the PU uses the corresponding spectrum band) to transmit the collected information to a fusion center (hereinafter, referred to as "FC"). The secondary user senses an interest spectrum through a terminal device that is used. In FIG. 1A, a receiver used by the secondary user is represented as "CR".

FIG. 1B is a block diagram illustrating a CSS apparatus in a cognitive radio network. In FIG. 1B, there exist M CRs, and each of CRs senses whether a PU uses a specific spectrum band ($H_0$ or $H_1$) and transmits the sensed result (x) to an FC 200. The FC 200 adds up the transmitted analysis result values to thereby determine whether the PU occupies a corresponding spectrum band. In the present disclosure, the CR generates the analysis result value taking non-Gaussian noise into consideration.

Referring to FIG. 1B, the receiver of the secondary user (CR) includes a reception unit 50 and a detection unit 100. The reception unit 50 and the detection unit 100 may be included in a physically same device. Because of the CSS apparatus, M CRs may exist, and each of the CRs includes the reception unit 50 and the detection unit 100. For example, a $CR_1$ includes a reception unit 50$a$ and a detection unit 100$a$, and a $CR_2$ includes a reception unit 50$b$ and a detection unit 100$b$.

A process for taking non-Gaussian noise into consideration in the present example will be first described.

In a cognitive radio network including a single FC 200 and M receivers of secondary users (CRs), an n-th baseband sample $y_m(n)=y_{m,I}(n)+jy_{m,Q}(n)$ of an m-th CR (m=1, 2, ..., and M) may be represented as the following Equation 1 when a PU signal does not exist.

$$y_m(n)=w_m(n), n=1,2,\ldots N \quad \text{[Equation 1]}$$

Here, subscripts I and Q respectively denote an in-phase component of a complex number and a quadrature component thereof, N denotes the number of observation samples, $w_m(n)$ denotes complex additive noise represented as $w_{m,I}(n)+jw_{m,Q}(n)$, which is assumed to be independent of m and n.

When a PU signal exists, $y_m(n)$ may be represented as the following Equation 2.

$$y_m(n)=h_m s(n)+w_m(n), n=1,2,\ldots N \quad \text{[Equation 2]}$$

Here, $s(n)=s_I(n)+js_Q(n)$ denotes an n-th sample of a complex signal transmitted from a PU, $h_m=h_{m,I}(n)+jh_{m,Q}(n)$ denotes a complex channel coefficient in which $\{h_m\}_{m=1}^M$ is assumed to have independent and identically distributed random variables, and not to be changed during a spectrum sensing period.

The non-Gaussian noise according to an embodiment of the present example is modeled in accordance with bivariate isotropic symmetric a-stable (BISaS) distribution. A probability density function (PDF) of the BISaS distribution may be represented as the following Equation 3.

$$f_{BI}(u_1, u_2) = \quad \text{[Equation 3]}$$
$$\frac{1}{(2\pi)^2}\int_{-\infty}^{\infty}\int_{-\infty}^{\infty}\exp\left\{-j(u_1 t_1 + u_2 t_2) - \gamma(t_1^2+t_2^2)^{\frac{\alpha}{2}}\right\}dt_1 dt_2$$

Here, $\alpha$ denotes a characteristic exponent ($0<\alpha\leq 2$) in which a thickness of both ends of the PDF is increased along with a decrease in a value of $\alpha$, indicating that the impulsive noise component becomes more dominant, and $\gamma$ denotes the dispersion in which the PDF more widely spreads along with an increase in a value of $\gamma$. The BISaS is known to be arranged in the form in which the PDF is closed only when $\alpha=1, 2$. The PDF of Equation 3 may be represented as bivariate Cauchy distribution as shown in the following Equation 4 when $\alpha=1$.

$$f_{BC}(u_1, u_2) = \frac{\gamma}{2\pi(u_1^2 + u_2^2 + \gamma^2)^{3/2}} \quad \text{[Equation 4]}$$

In addition, when $\alpha=2$, the PDF of Equation 3 may be represented as bivariate Gaussian distribution as shown in the following Equation 5.

$$f_{BG}(u_1, u_2) = \frac{1}{2\pi\sigma^2}\exp\left(-\frac{u_1^2 + u_2^2}{2\sigma^2}\right) \quad \text{[Equation 5]}$$

Here, $\sigma^2 = 2\gamma$ is satisfied, which denotes the variance.

Non-coherent spectrum sensing may not more increase sensing performance even though a sample observation period is increased to infinity when there is no information about noise dispersion in a low signal-to-noise ratio (SNR) environment. This phenomenon is called an SNR wall phenomenon. When cooperatively performing sensing by increasing the number of CRs participating in a CR network, such a SNR wall phenomenon may be overcome. However, the present example may not handle a method for overcoming the SNR wall, and therefore it is assumed that distribution of noise is known.

When information such as a modulation method of PU signals, a pulse type, a packet type, and the like is known to the CR, matched filter detection has optimized performance. However, it is difficult for the CR to obtain information about PU signals in practice, and therefore a generalized likelihood ratio test (GLRT) using a maximum likelihood estimate (MLE) of $h_m s(n)$ with respect to an m-th CR may be used instead of the matched filter.

A spectrum sensing problem in the CR network may be summarized as a binary hypothesis test problem as shown below. Null hypothesis $H_0$ and alternative hypothesis $H_1$ may be defined as the following Equations 6 and 7.

$H_0$: Spectrum of PU is empty [Equation 6]

$H_1$: Spectrum of PU is occupied [Equation 7]

When a joint PDF with respect to an observation $\underline{y}_m$ vector in hypothesis of $H_c$ ($c \in 0, 1$) is $f_{h_c}$, GLRT test statistics $T_{GL}(\underline{y}_m)$ in an m-th CR may be represented as the following Equation 8.

$$T_{GL}(\underline{y}_m) = \ln\left\{\frac{f_{H_1}(\underline{y}_m)}{f_{H_0}(\underline{y}_m)}\right\} \quad \text{[Equation 8]}$$

$$= \sum_{n=1}^{N} \ln\left\{\frac{f_m(y_m(n) - h_m\hat{s}(n))}{f_m(y_m(n))}\right\}$$

Here, $\ln(\cdot)$ and $\hat{\cdot}$ respectively denote a natural logarithm and an MLE, and $f_m$ denotes a combined PDF of $w_{m,I}(n)$ and $w_{m,Q}(n)$ with respect to $n=1, 2, \ldots$, and N.

When a molecular component within the natural logarithm of Equation 8 is rewritten with respect to Cauchy noise and Gaussian noise, the following Equations 9 and 10 may be respectively obtained. In a derivation process, relationships $f_m(x) = f_{BI}(\text{Re}(x), \text{Im}(x))$ and $\gamma = \gamma_m$ with Equations 4 and 5 are used.

$$f_m(y_m(n) - h_m\hat{s}(n)) = \frac{\gamma_m}{2\pi\{|y_m(n) - h_m\hat{s}(n)|^2 + \gamma_m^2\}^{3/2}} \quad \text{[Equation 9]}$$

$$f_m(y_m(n) - h_m\hat{s}(n)) = \frac{1}{2\pi\sigma_m^2}\exp\left\{-\frac{1}{2\sigma_m^2}|y_m(n) - h_m\hat{s}(n)|^2\right\} \quad \text{[Equation 10]}$$

Here, Re(x) and Im(x) respectively denote a part of a real number of x and a part of an imaginary number thereof, and $r_m$ and $\sigma_m^2$ respectively denote dispersion of Cauchy distribution with respect to an m-th CR and dispersion of Gaussian distribution with respect to the m-th CR. Thus, MLE with respect to $h_m s(n)$ in Cauchy and Gaussian noise environments may be easily obtained from Equations 9 and 10 as shown in the following Equation 11.

$$\widehat{h_m s(n)} = y_m(n) \quad \text{[Equation 11]}$$

As a method for reducing influence of an impulsive component of non-Gaussian noise, order statistics are used. This is because an observation sample having large amplitude in an impulsive noise environment tends to be derived by a noise component rather than a signal component. An approach that selects and uses observation samples having small amplitude through a non-linear technique based on order statistics may exhibit more excellent performance compared to a method that uses all observation samples in a non-Gaussian impulsive noise environment.

First, order statistics $\{\underline{y}_{m_{(1)}}, \underline{y}_{m_{(2)}}, \ldots, \underline{y}_{m_{(N)}}\}$ with respect to an observation vector $\underline{y}_m$ of an m-th CR are generated. Here, the order statistics have a relationship of $|y_{m_{(1)}}| \leq |y_{m_{(2)}}| \leq \ldots \leq |y_{m_{(N)}}|$. In this instance, $J_m$ observation samples are selected in size ascending order, and GLRT test statistics based on selective observation sample (GLRT based on selected observations: GSO) are proposed as shown in the following Equation 12.

$$T_{GSO}(\underline{y}_m, J_m) = \sum_{l=1}^{J_m} \ln\left\{\frac{f_m(y_{m_{(l)}} - h_m\hat{s}_{(l)})}{f_m(\underline{y}_{m_{(l)}})}\right\} \quad \text{[Equation 12]}$$

Here, $J_m$ denotes the number of observation samples selected in an m-th CR, and $\underline{h_m s_{(l)}} = h_m s(\overline{n})$ with respect to an integer $\overline{n}$ satisfying $y_m(\overline{n}) = \underline{y}_{m_{(l)}}$ is obtained. In accordance with Equations 8 to 12, test statistics may be defined as shown in the following Equations 13 and 14 in Cauchy and Gaussian noise environments, respectively.

$$G_C(\underline{y}_m, k) = \sum_{l=1}^{k} \ln\left\{1 + \frac{|y_{m_{(l)}}|^2}{\gamma_m^2}\right\} \quad \text{[Equation 13]}$$

$$G_G(\underline{y}_m, k) = \frac{1}{2\sigma_m^2}\sum_{l=1}^{k} |y_{m_{(l)}}|^2 \quad \text{[Equation 14]}$$

Here, $k \in \{1, 2, \ldots, \text{and } N\}$ is obtained. Relationships $T_{GL}(\underline{y}_m) = G_C(\underline{y}_m, N)$ and $T_{GSO}(\underline{y}_m) = G_C(\underline{y}_m, J_m)$ are obtained in a Cauchy noise environment, and relationships $T_{GL}(\underline{y}_m) = G_G(\underline{y}_m, N)$ and $T_{GSO}(\underline{y}_m) = G_G(\underline{y}_m, J_m)$ are obtained in a Gaussian noise environment. A binary SSI value $x_m$ of the m-th CR may be obtained as shown in the following Equation 15 through GSO detection, and the obtained binary SSI value may be transmitted to the FC 200.

The detection unit 100 of the CSS apparatus 500 generates an analysis result value with respect to the observation vector using the above-described GLRT test statistics.

The CSS apparatus 500 includes a receiver of a secondary user (CR) which includes a reception unit 50 configured to receive observation vectors with respect to a spectrum band allocated to a primary user (PU), and a detection unit 100 configured to generate an analysis result value with respect to each of the observation vectors using a GLRT with respect to order statistics of reception samples taking non-Gaussian noise into consideration. In addition, the CSS apparatus 500 includes a fusion center unit 200 configured to receive the analysis result value from the receiver of the secondary user (CR), and to determine whether the spectrum band is used by fusing the analysis result value.

Thus, the detection unit 100 generates the GLRT test statistics based on a result obtained by modeling non-Gaussian noise using a PDF of BISαS distribution.

Figure 2:
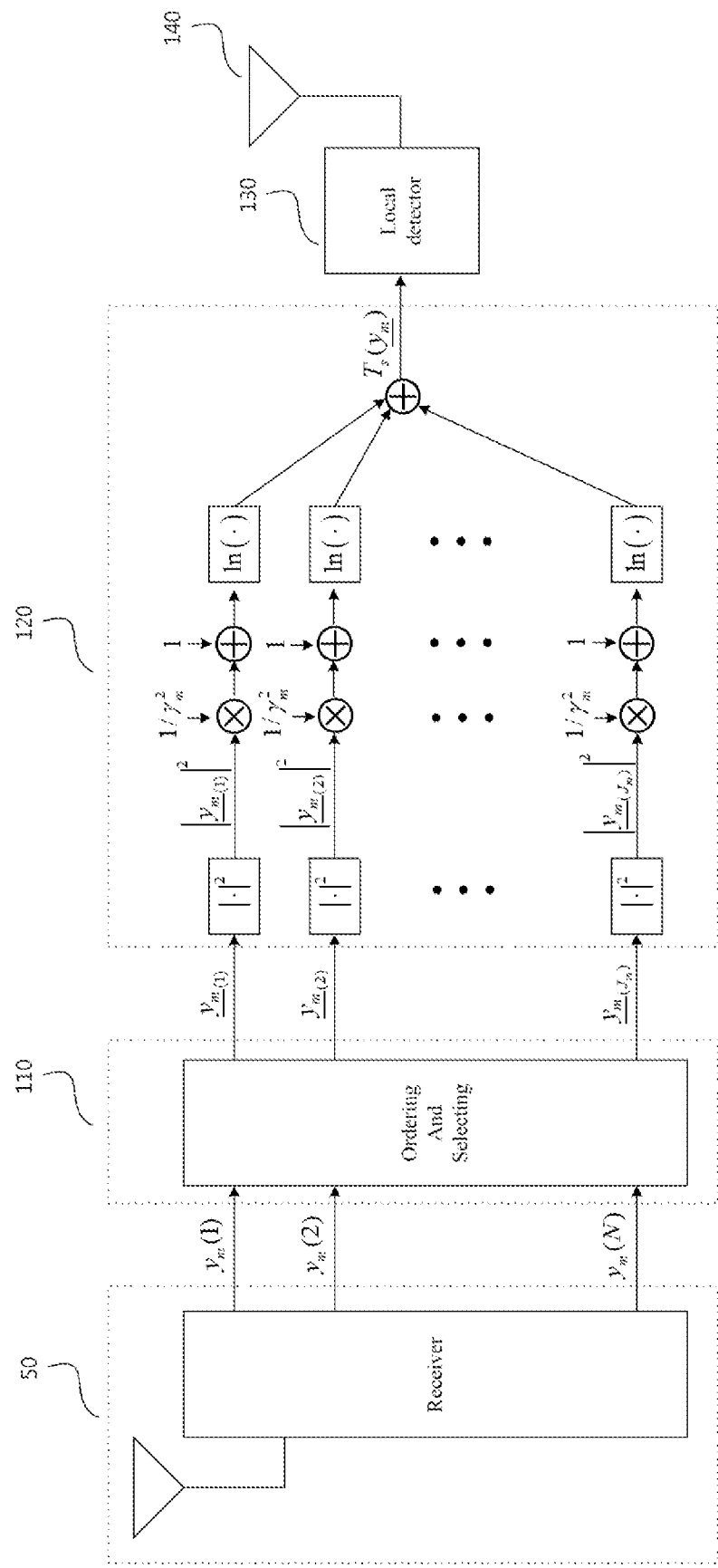
FIG. 2 is a block diagram illustrating an example of an m-th CR detector taking Cauchy noise into consideration.
Figure 3:
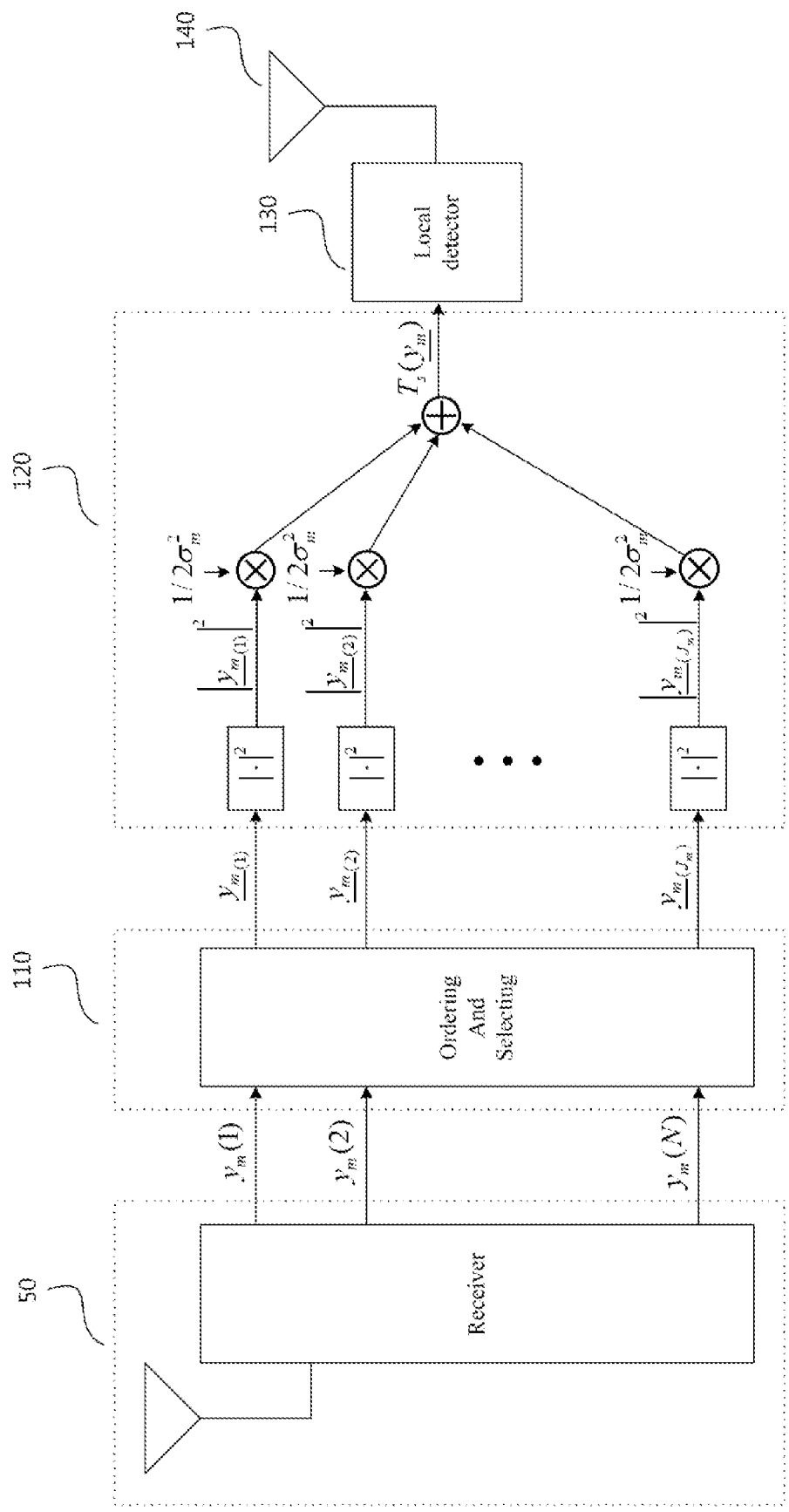
FIG. 3 is a block diagram illustrating an example of an m-th CR detector taking Gaussian noise into consideration.

FIG. 2 is a block diagram illustrating an example of an m-th CR detector taking Cauchy noise (BISαS with α=1) into consideration, and FIG. 3 is a block diagram illustrating an example of an m-th CR detector taking Gaussian noise (BI-SαS with α=2) into consideration. FIGS. 2 and 3 have a common configuration, but have different formulas for generating GLRT test statistics, and therefore may be shown as separate drawings.

The detection unit 100 may include an order statistics unit 110 configured to generate order statistics with respect to an observation vector $\underline{y}_m$, a test statistics generation unit 120 configured to select observation samples in size ascending order in the order statistics to generate GLRT test statistics, a local detector 130 configured to determine a sensing result in an m-th CR based on the test statistics, and a transmission unit 140 configured to transmit the result data of the local detector 130 to the fusion center unit 200.

The observation sample corresponds to N sample signals transmitted from a PU, and the observation vector denotes a set of use state information including these signals.

The test statistics generation unit 120 generates GLRT test statistics using the above-described Equation 12. It is preferable that the test statistics generation unit 120 use Equation 13 in a Cauchy noise environment and Equation 14 in a Gaussian noise environment.

The local detector 130 determines a sensing result in an m-th CR using the result of the GLRT test statistics with respect to the N observation samples.

$$x_m = \begin{cases} 1, & \text{if } T_{GSO}(\underline{y}_m, J_m) \geq \lambda_m \\ 0, & \text{otherwise} \end{cases} \quad \text{[Equation 15]}$$

Here, $x_m=0$ denotes that a spectrum is empty, $x_m=1$ denotes that a spectrum is occupied, and $\lambda_m$ denotes a threshold value in accordance with a false alarm probability in an m-th CR.

The transmission unit 140 transmits, to the FC 200, the analysis result value ($x_m$) with respect to the GLRT test statistics determined in the local detector 130 using Equation 15.

In the FC 200, test statistics $T_{FC}(\underline{x})$ of the FC 200 may be generated using a set $\underline{x}=[x_1, x_2, \ldots x_M]$ of M analysis result values.

It is assumed that the analysis result values transmitted from the CR to the FC 200 are transmitted without any error, and a hypothesis test is performed through a counting rule.

Specifically, the number of is within $\underline{x}$ is counted, the counted number and a threshold value of the FC 200 are compared, and in the present example, a majority rule is considered.

The test statistics $T_{FC}(\underline{x})$ is obtained as $$T_{FC}(x) = \sum_{m=1}^{M} x_m,$$

and therefore a final decision is made as shown in the following Equation 16 in the FC 200.

$$T_{FC}(x) \underset{H_0}{\overset{H_1}{\gtrless}} \lambda_{FC} \quad \text{[Equation 16]}$$

A threshold value $\lambda_{FC}$ of Equation 16 has a value of $\lceil M/2 \rceil$. Here, $\lceil x \rceil$ indicates the smallest integer greater than or equal to x.

The FC 200 finally determines whether a corresponding spectrum band is occupied by a PU using Equation 16.

Figure 4:
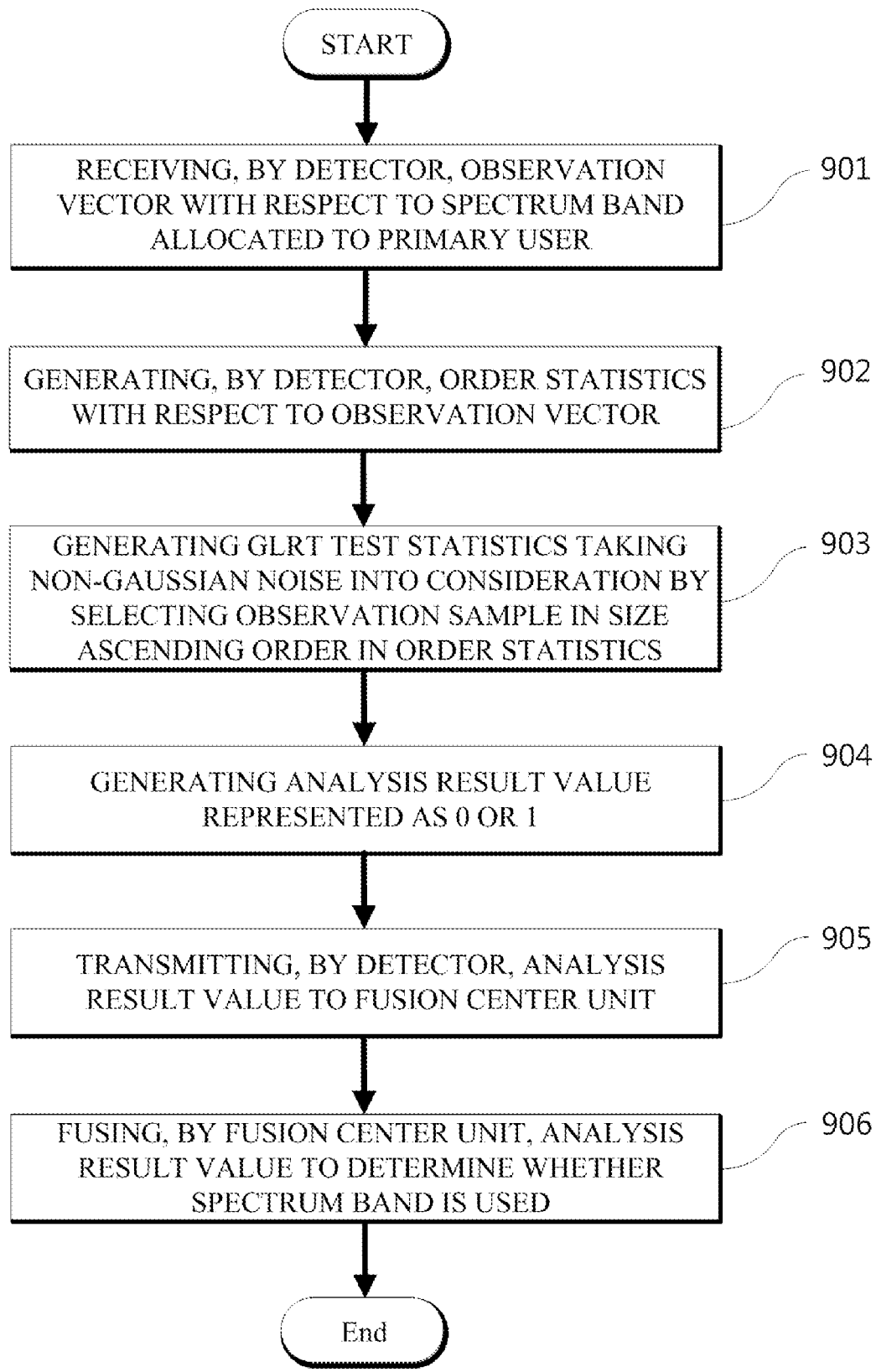
FIG. 4 is a flowchart illustrating an example of a CSS method taking non-Gaussian noise into consideration.

FIG. 4 is a flowchart illustrating an example of a CSS method taking non-Gaussian noise into consideration.

The CSS method includes receiving, by a detector of a plurality of secondary users, observation vectors which are use state information of a spectrum band allocated to a PU in a cognitive radio (CR) network (901), generating, by the detector, order statistics with respect to the observation vectors $\underline{y}_m$ (902), generating GLRT test statistics by selecting an observation sample in size ascending order in the order statistics (903), generating an analysis result value $x_m$ represented as 0 or 1 (904), transmitting, by the detector, the analysis result value to an FC 200, and fusing, by the FC 200, the analysis result value to determine whether the spectrum band is used (905). Here, the detector corresponds to the above-described receiver of the secondary user or the detection unit 100.

The generating, by the detector, the analysis result value with respect to each of the observation vectors using the GLRT considering non-Gaussian noise corresponds to the generating, by the detector, of the order statistics with respect to the observation vectors $\underline{y}_m$ (902), the generating of the GLRT test statistics by selecting the observation sample in size ascending order in the order statistics (903), and the generating of the analysis result value $x_m$ represented as 0 or 1 (904).

A process of generating the analysis result value $x_m$ is performed by the above-described local detector.

A specific process of generating the GLRT test statistics, a process of calculating the analysis result value, and a process of finally determining, by the FC 200, final presence and absence of occupancy of a PU are the same as described above.

Hereinafter, results obtained by testing effects of the present disclosure will be described.

In order to verify performance, in a BISαS noise environment in which α=1, 1.5, 2 and γ=1, receiver operation characteristics (ROC) performance of a CSS technique to which a GSO detector is applied is analyzed. A Rayleigh fading channel is considered as a channel environment, and it is assumed that a complex channel gain $\{h_m\}_{m=1}^{M}$ is changed for each symbol time and $E[|h_m|^2]=1$ is satisfied.

In addition, it is assumed that signal power $$P_s = \sum_{n=1}^{N} |s(n)|^2$$

is 10, $s(1)=s(2)=\ldots s(N)$ is satisfied, and $s_I(n)=s_Q(n)$ is satisfied.

Prior to performance analysis of the CSS technique, a value of $J_m$ with respect to the GSO detector is first determined M=1 is assumed, representation of $J_m=J(J\in\{0.2N, 0.4N, \ldots, N\})$ is obtained, and the GSO detectors to which $G_C(\underline{y_m},J)$ and $G_C(\underline{y_m},J)$ are applied and are indicated as $GSO_C(J)$ and $GSO_G(J)$, respectively.

In theory, $J_m$ may have an infinite value, but five values of $J_m$ are considered for practicality.

Figure 5:
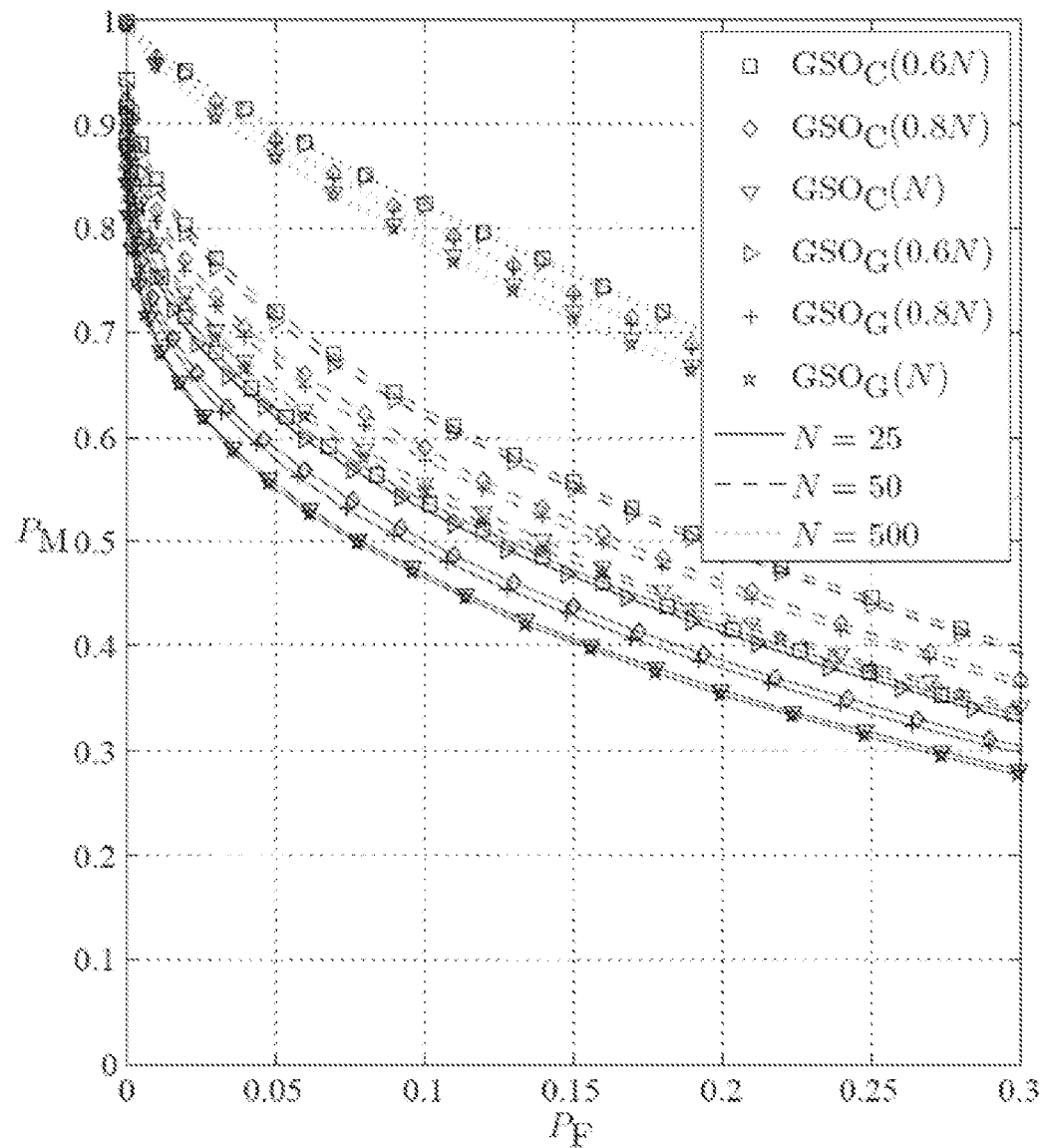
FIG. 5 is a graph illustrating an example of receiver operation characteristics (ROC) performance of GSO detectors in a bivariate isotropic symmetric α-stable (BISαS) noise environment in which α=2 is satisfied.
Figure 6:
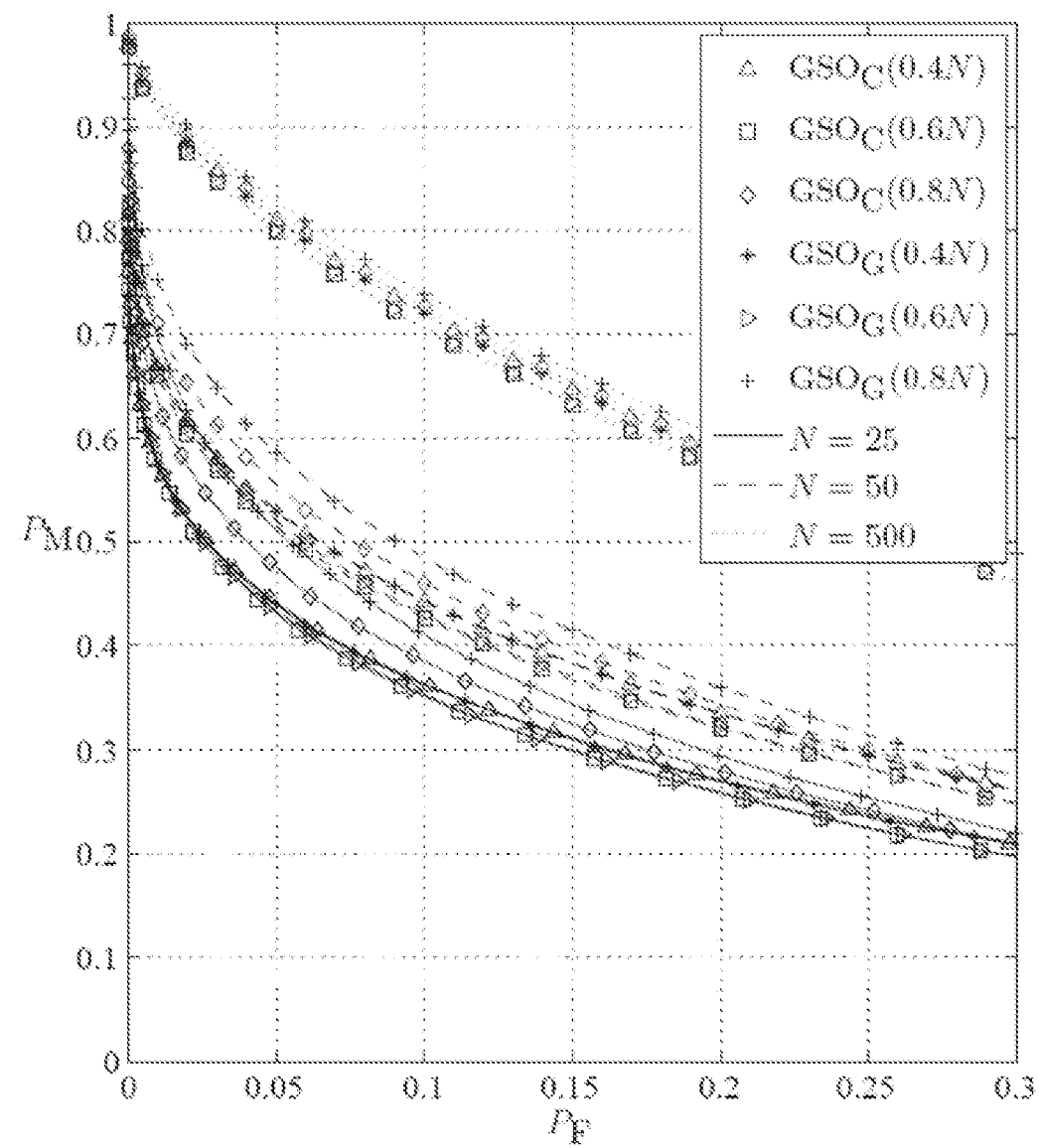
FIG. 6 is a graph illustrating an example of ROC performance of GSO detectors in a BISαS noise environment in which α=1.5 is satisfied.
Figure 7:
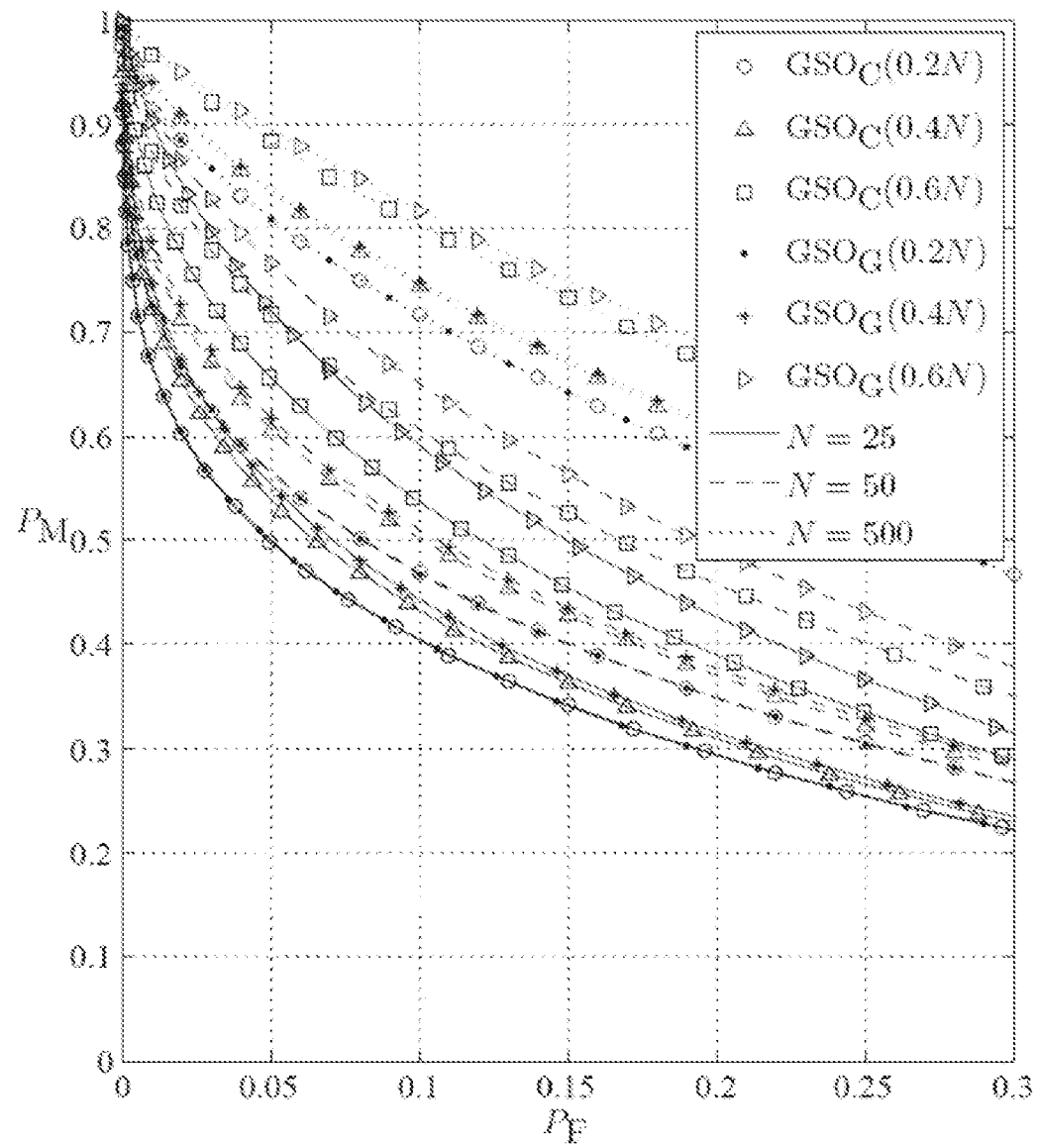
FIG. 7 is a graph illustrating an example of ROC performance of GSO detectors in a BISαS noise environment in which α=1 is satisfied.

FIG. 5 is a graph illustrating an example of ROC performance of GSO detectors in a BISαS noise environment in which α=2 is satisfied, FIG. 6 is a graph illustrating ROC performance of GSO detectors in a BISαS noise environment in which α=1.5 is satisfied, and FIG. 7 is a graph illustrating ROC performance of GSO detectors in a BISαS noise environment in which α=1 is satisfied. Here, $P_F$ and $P_M$ respectively denote a false alarm probability and a missed detection probability. From the drawings, it can be seen that performance of GSO is more excellent along with a decrease in N, and this is because a value of signal power $P_s/N$ per observation sample is increased along with the decrease in N.

From FIG. 5, it can be seen that the ROC performance is more excellent along with an increase in J in the Gaussian noise environment. In addition, from FIGS. 6 and 7, it can be seen that the GSO detector to which J=0.6N and J=0.2N are applied has excellent ROC performance compared to other cases.

As described above, according to the embodiments of the present disclosure, signals of the PU may be more reliably sensed in an actual communication environment. Consequently, reliability of a CR communication network may be increased.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cooperative spectrum sensing (CSS) apparatus comprising:
   a receiver of a secondary user configured to include a reception unit to receive observation vectors with respect to a spectrum band allocated to a primary user (PU), and a detection unit to generate an analysis result value with respect to each of the observation vectors using a generalized likelihood ratio test (GLRT) with respect to order statistics of reception samples using a non-Gaussian noise distribution model; and
   a fusion center unit configured to fuse the analysis result values to determine whether the spectrum band is used.

2. The CSS apparatus of claim 1, wherein the detection unit performs modeling on the non-Gaussian noise to follow bivariate isotropic symmetric α-stable (BISαS) distribution.

3. The CSS apparatus of claim 1, wherein the detection unit includes:
   an order statistics unit configured to generate order statistics ($\{\underline{y_{m(1)}}, \underline{y_{m(2)}}, \ldots, \underline{y_{m(N)}}\}$) with respect to the observation vector ($\underline{y_m}$);
   a test statistics generation unit configured to select an observation sample in size ascending order in the order statistics to generate GLRT test statistics;
   a local detector configured to yield detection result data with respect to presence and absence of a PU signal using the GLRT test statistics with respect to the observation sample; and
   a transmission unit configured to transmit the detection result data to the fusion center unit.

4. The CSS apparatus of claim 3, wherein the test statistics generation unit generates the GLRT test statistics ($T_{GSO}(\underline{y_m}, J_m)$) with respect to the observation sample using the following Equation $$T_{GSO}(\underline{y_m}, J_m) = \sum_{l=1}^{J_m} \ln\left\{\frac{f_m(\underline{y_{m(l)}} - h_m \hat{s}_{(l)})}{f_m(\underline{y_{m(l)}})}\right\}$$

(Here, $J_m$ denotes the number of observation samples selected in an m-th detection unit, $\ln(\cdot)$ denotes a natural logarithm, $\hat{\cdot}$ denotes a maximum likelihood estimation (MLE) value, s(n) denotes an n-th sample of a complex signal transmitted from the PU, $h_m=h_{m,I}(n)+jh_{m,Q}(n)$ denotes a complex channel coefficient, and $f_m$ denotes a probability density function (PDF) of bivariate isotropic symmetric α-stable (BISαS) distribution in which complex additive noises $w_{m,I}(n)$ and $w_{m,Q}(n)$ are combined.

5. The CSS apparatus of claim 3, wherein the test statistics generation unit generates the GLRT test statistics ($G_C(\underline{y_m}, k)$) with respect to the observation sample using the following Equation with respect to bivariate Cauchy noise $$G_C(\underline{y_m}, k) = \sum_{l=1}^{k} \ln\left\{1 + \frac{|\underline{y_{m(l)}}|^2}{\gamma_m^2}\right\}$$

(Here, $k \in \{1, 2, \ldots, N\}$ and $\ln(\cdot)$ denotes a natural logarithm, and $\gamma_m^2$ denotes the dispersion of the bivariate isotropic symmetric α-stable (BISαS) noise for the m-th detection unit).

6. The CSS apparatus of claim 3, wherein the test statistics generation unit generates the GLRT test statistics ($G_G(\underline{y_m}, k)$) with respect to the observation sample using the following Equation with respect to bivariate Gaussian noise $$G_G(\underline{y_m}, k) = \frac{1}{2\sigma_m^2} \sum_{l=1}^{k} |\underline{y_{m(l)}}|^2$$

(Here, and $k \in \{1, 2, \ldots, N\}$ and $\sigma_m^2$ denotes variance of Gaussian distribution for the m-th detection unit).

7. The CSS apparatus of claim 3, wherein the local detector generates the detection result data ($x_m$) in accordance with the following Equation $$x_m = \begin{cases} 1, & \text{if } T_{GSO}(\underline{y_m}, J_m) \geq \lambda_m \\ 0, & \text{otherwise} \end{cases}$$

(Here, $T_{GSO}(\underline{y_m}, J_m)$ denotes GLRT test statistics with respect to $\underline{y_m}$, and $\lambda_m$ denotes a threshold value in accordance with a false alarm probability with respect to an m-th detection unit).

8. The CSS apparatus of claim 1, wherein the fusion center unit obtains test statistics ($T_{FC}(x)$) obtained as $$T_{FC}(x) = \sum_{m=1}^{M} x_m$$

using M analysis result values ($\underline{x}=[x_1, x_2, \ldots, x_M]$), and determines whether the spectrum band is used using $$T_{FC}(x) \overset{H_1}{\underset{H_0}{\gtrless}} \lambda_{FC}$$

(here, $H_0$ denotes that a spectrum of the PU is empty, $H_1$ denotes that the spectrum of the PU is occupied, $\lambda_{FC}$ denotes $\lceil M/2 \rceil$, and $\lceil x \rceil$ denotes the smallest integer greater than or equal to x).

9. A CSS method comprising:
receiving, by a detector of secondary users, observation vectors which are using state information of a spectrum band allocated to a primary user (PU) in a cognitive radio (CR) network;
generating, by the detector, an analysis result value with respect to each of the observation vectors using generalized likelihood ratio test (GLRT) with respect to order statistics of reception samples using a non-Gaussian noise distribution model;
transmitting, by the detector, the analysis result value to a fusion center unit; and
fusing, by the fusion center unit, the analysis result value to determine whether the spectrum band is used.

10. The CSS method of claim 9, wherein the generating includes:
generating the order statistics ($\{\underline{y_{m_{(1)}}}, \underline{y_{m_{(2)}}}, \ldots, \underline{y_{m_{(N)}}}\}$) with respect to the observation vector ($\underline{y_m}$);
selecting an observation sample in size ascending order in the order statistics to generate GLRT test statistics; and
generating the analysis result value ($x_m$) represented as 0 or 1.

11. The CSS method of claim 10, wherein the GLRT test statistics ($T_{GSO}(\underline{y_m}, J_m)$) is generated using the following Equation $$T_{GSO}(\underline{y_m}, J_m) = \sum_{l=1}^{J_m} \ln\left\{\frac{f_m(y_{m_{(l)}} - h_m \hat{s}_{(l)})}{f_m(y_{m_{(l)}})}\right\}$$

(Here, $J_m$ denotes the number of observation samples selected in an m-th detection unit, $\ln(\cdot)$ denotes a natural logarithm, $\hat{\cdot}$ denotes a maximum likelihood estimation (MLE) value, $s(n)$ denotes an n-th sample of a complex signal transmitted from the PU, $h_m = h_{m,I}(n) + jh_{m,Q}(n)$ denotes a complex channel coefficient, and $f_m$ denotes a probability density function(PDF) of bivariate isotropic symmetric α-stable BISαS) distribution in which complex additive noises $w_{m,I}(n)$ and $w_{m,Q}(n)$ and are combined.

12. The CSS method of claim 10, wherein the GLRT test statistics ($G_C(\underline{y_m}, k)$ is generated using the following Equation with respect to bivariate Cauchy noise $$G_C(\underline{y_m}, k) = \sum_{l=1}^{k} \ln\left\{1 + \frac{|y_{m_{(l)}}|^2}{\gamma_m^2}\right\}$$

(Here, $k \in \{1, 2, \ldots, N\}$ and $\ln(\cdot)$ denotes a natural logarithm, and $\gamma_m^2$ denotes the dispersion of the bivariate isotropic symmetric α-stable (BISαS) noise for the m-th detection unit).

13. The CSS method of claim 10, wherein the GLRT test statistics ($G_G(\underline{y_m}, k)$) is generated using the following Equation with respect to bivariate Gaussian noise $$G_G(\underline{y_m}, k) = \frac{1}{2\sigma_m^2} \sum_{l=1}^{k} |y_{m_{(l)}}|^2$$

(Here, $k \in \{1, 2, \ldots, N\}$ and $\sigma_m^2$ denotes variance of Gaussian distribution for the m-th detection unit).

14. The CSS method of claim 10, wherein the analysis result value ($x_m$) is generated in accordance with the following Equation $$x_m = \begin{cases} 1, & \text{if } T_{GSO}(\underline{y_m}, J_m) \geq \lambda_m \\ 0, & \text{otherwise} \end{cases}$$

(Here, $T_{GSO}(\underline{y_m}, J_m)$ denotes GLRT test statistics with respect to $\underline{y_m}$, and $\lambda_m$ denotes a threshold value in accordance with a false alarm probability with respect to an m-th detection unit).

15. The CSS method of claim 9, wherein, in the determining of whether the spectrum band is used, the fusion center unit obtains test statistics ($T_{FC}(x)$) obtained as $$T_{FC}(x) = \sum_{m=1}^{M} x_m$$

using M analysis result vales ($\underline{x}=[x_1, x_2, \ldots, x_M]$), and determines whether the spectrum band is used using $$T_{FC}(x) \overset{H_1}{\underset{H_0}{\gtrless}} \lambda_{FC}$$

(here, $H_0$ denotes that a spectrum of the PU is empty, $H_1$ denotes that the spectrum of the PU is occupied, $\lambda_{FC}$ denotes $\lceil M/2 \rceil$, and $\lceil x \rceil$ denotes the smallest integer greater than or equal to x).

16. A receiver used in a cooperative spectrum sensing (CSS), comprising:
a reception unit configured to receive observation vectors with respect to a spectrum band allocated to a primary user (PU); and
a detection unit configured to generate an analysis result value with respect to each of the observation vectors using generalized likelihood ratio test (GLRT) with respect to order statistics of reception samples using a non-Gaussian noise distribution model.

17. The receiver of claim 16, wherein the detection unit performs modeling on the non-Gaussian noise to follow bivariate isotropic symmetric α-stable (BISαS) distribution.

18. The receiver of claim 16, wherein the detection unit includes:
an order statistics unit configured to generate order statistics ($\{\underline{y}_{m_{(1)}}, \underline{y}_{m_{(2)}}, \ldots, \underline{y}_{m_{(N)}}\}$) (with respect to the observation vector ($\underline{y}_m$);
a test statistics generation unit configured to select an observation sample in size ascending order in the order statistics to generate GLRT test statistics;
a local detector configured to yield detection result data with respect to presence and absence of a PU signal using the GLRT test statistics with respect to the observation sample; and
a transmission unit configured to transmit the detection result data to the fusion center unit.

19. The receiver of claim 18, wherein the test statistics generation unit generates the GLRT test statistics ($G_C(\underline{y}_m, k)$) with respect to the observation sample using the following Equation with respect to bivariate Cauchy noise $$G_C(\underline{y}_m, k) = \sum_{l=1}^{k} \ln\left\{1 + \frac{|y_{m_{(l)}}|^2}{\gamma_m^2}\right\}$$

(Here, $k \in \{1, 2, \ldots, N\}$ and $\ln(\cdot)$ denotes a natural logarithm, and $\gamma_m^2$ denotes the dispersion of the bivariate isotropic symmetric α-stable (BISαS) noise for the m-th detection unit).

20. The receiver of claim 18, wherein the test statistics generation unit generates the GLRT test statistics ($G_C(\underline{y}_m, k)$) with respect to the observation sample using the following Equation with respect to bivariate Gaussian noise $$G_G(\underline{y}_m, k) = \frac{1}{2\sigma_m^2} \sum_{l=1}^{k} |y_{m_{(l)}}|^2$$

(Here, $k \in \{1, 2, \ldots, N\}$ and $\sigma_m^2$ denotes variance of Gaussian distribution for the m-th detection unit).

* * * * *